(12) United States Patent
Pomerantz

(10) Patent No.: US 7,551,266 B2
(45) Date of Patent: Jun. 23, 2009

(54) DISTANCE DETERMINATION AND VIRTUAL ENVIRONMENT CREATION USING CIRCLE OF CONFUSION

(75) Inventor: Ori Pomerantz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/859,974

(22) Filed: Sep. 24, 2007

(65) Prior Publication Data

US 2009/0079957 A1     Mar. 26, 2009

(51) Int. Cl.
*G01C 3/08* (2006.01)
(52) U.S. Cl. .................. 356/4.03; 356/4.01; 356/4.1; 356/5.01
(58) Field of Classification Search ....... 356/3.01–28.5, 356/139.01–139.1
See application file for complete search history.

(56) References Cited

U.S. PATENT DOCUMENTS

| | | | | |
|---|---|---|---|---|
| 4,647,193 A | * | 3/1987 | Rosenfeld | 356/4.04 |
| 6,618,123 B2 | * | 9/2003 | Uomori et al. | 356/3.12 |
| 2005/0206874 A1 | * | 9/2005 | Dougherty | 356/4.05 |

* cited by examiner

*Primary Examiner*—Thomas H Tarcza
*Assistant Examiner*—Luke D Ratcliffe
(74) *Attorney, Agent, or Firm*—Yee & Associates, P.C.; Jeffrey S. LaBaw

(57) ABSTRACT

A data processing system, computer implemented method, and computer program product code determines distances to an object. Computer generated environments can be calculated therefrom. A light source is focused on an object at an unknown distance from an imaging device, creating a point-of-light. The imaging device, focused on a focal plane at a second location, records an out-of-focus image of the point-of-light at the first distance. From the out-of-focus image, the diameter of a circle of confusion for the point-of-light is identified. The distance between the object and the imaging device is then calculated from the circle of confusion.

16 Claims, 3 Drawing Sheets

DISTANCE DETERMINATION AND VIRTUAL ENVIRONMENT CREATION USING CIRCLE OF CONFUSION

BACKGROUND OF THE INVENTION

1. Field of the Invention

The present invention relates generally to a data processing system, computer implemented method, and computer program product code for a data processing system. More specifically, the present invention relates to a data processing system, computer implemented method, and computer program product code for generating an immersive three dimensional computer generated environment within a data processing system.

2. Description of the Related Art

Immersive three dimensional computer generated environments are being increasingly utilized for a variety of applications. Computer generated environments, sometimes referred to as virtual or 'CG' environments, have found use in entertainment applications, such as video games and movies. These computer generated environments are being increasingly used in geography, construction and urban studies involving site location analysis, emergency facilities planning, design review, marketing, and the like. Computer generated environments have even been used to show anatomical structures as a training tool for medical professionals.

Regardless of the specific application for which a computer generated environment has been developed, developers of these computer generated environments face a common problem: determining and modeling distances to remote objects quickly and simultaneously. In order to generate accurate modeling of a real environment, a developer of the virtual environment must be able to determine the spatial relation between various objects in the real environment. Currently, various forms of three dimensional scanners are used to determine this information.

A three dimensional scanner analyzes a real-world object or environment to collect data on the object's shape, and further analyze the relationship between that object and other objects in the environment. The collected data is then used to construct the computer generated, or virtual, environment. The three dimensional scanner can utilize a variety of different technologies, each having its own limitations, advantages and costs.

A time-of-flight three dimensional scanner is a scanner type that emits a high intensity light source, such as a laser, and measures the amount of time elapsed before the emitted light is reflected from the modeled object and seen by a detector. Thus, a time-of-flight three dimensional scanner uses a laser light to scan the environment to be modeled. Because the speed of light is a known constant, recording the elapsed time between emission and detection allows for an easy calculation of the distance to a modeled object. Therefore, the accuracy of a time-of-flight three dimensional scanner depends on the precision with which the scanner can measure the elapsed time. While time-of-flight three dimensional scanners are capable of operating over very long distances, they suffer from relative inaccuracy due to difficulties in timing the high speed light waves.

A triangulation three dimensional scanner reflects a laser off of the modeled object, and detects the reflection of the laser at a third location. By knowing the distance between the emitting laser and the detector, as well as the angle formed between the modeled object, the emitter and the detector, a trigonometric relationship can be easily calculated to find the distance between any of the three objects. Triangulation three dimensional scanner are relatively more accurate than a time-of-flight scanner, however, the distances over which they can be effectively used is much less than that of the time-of-flight scanner.

A structured light three dimensional scanner projects a pattern of light on the subject records deformations of the reflected pattern. A camera, offset slightly from the pattern projector, looks at the shape of the reflected pattern uses a technique similar to triangulation to calculate the distance of every reflected point of the pattern. While a structured light three dimensional scanner is able to quickly and accurately scan a large area, the cost of such a system is often preclusive for large scale applications.

Despite the availability of various methods of determining relative distances for the creation of computer generated environments, there remains a need for improvement. It would be beneficial for the developer of a virtual computer generated environment to be able to quickly and accurately assimilate the various relative positions and sizes of objects to be input into the computer generated environment in a cost effective manner.

SUMMARY OF THE INVENTION

A data processing system, computer implemented method, and computer program product code determines distances to an object. Virtual computer generated environments can be calculated therefrom. A laser is focused on an object at an unknown distance from an imaging device, creating a point-of-light. The imaging device, focused on a focal plane at a second location, records an out-of-focus image of the point-of-light at the first distance. From the out-of-focus image, the diameter of a circle of confusion for the point-of-light is identified. The distance between the object and the imaging device is then calculated from the circle of confusion.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
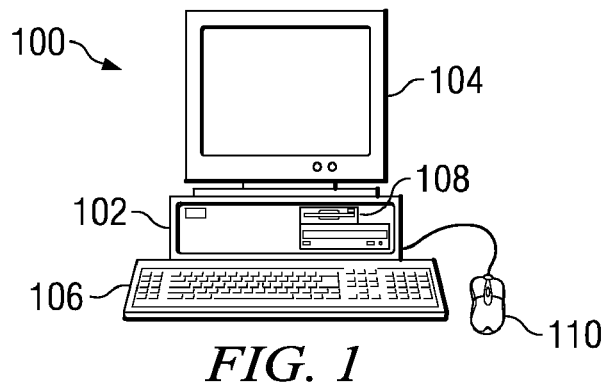
FIG. 1 is a pictorial representation of a data processing system is shown in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
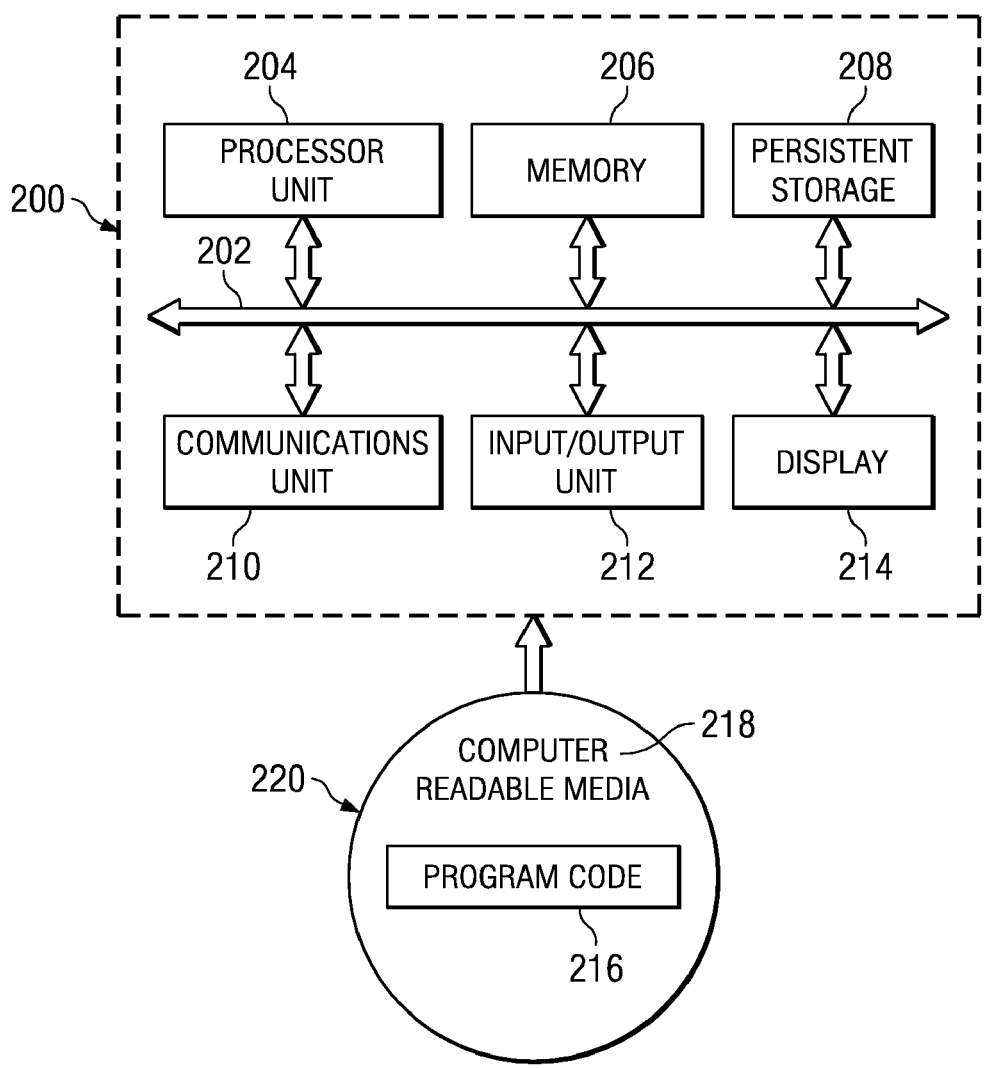
FIG. 2 depicts a block diagram of a data processing system in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including an interface and memory controller hub (interface/MCH) 202 and an interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to interface and memory controller hub 202 through an accelerated graphics port (AGP), for example.

In the depicted example, local area network (LAN) adapter 212 is coupled to interface and I/O controller hub 204, audio adapter 216, keyboard and mouse adapter 220, modem 222, read only memory (ROM) 224, universal serial bus (USB) and other ports 232. PCI/PCIe devices 234 are coupled to interface and I/O controller hub 204 through bus 238. Hard disk drive (HDD) 226 and CD-ROM 230 are coupled to interface and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206. This operating system coordinates and controls various components within data processing system 200 in FIG. 2. The operating system may be a commercially available operating system, such as Microsoft® Windows Vista™. (Microsoft® and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in interface and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

A circle of confusion is an optical spot caused by a cone of light rays from a lens not coming to a perfect focus when imaging a point source. That is, the circle of confusion's optical spot, often times seen as a circle, will appear when the image is not in focus. The circle of confusion is limited by the resolution of the imaging device: if the diameter of the formed circle of confusion is less than the resolution of the imaging device, the image will appear as "in focus."

By knowing the diameter of a circle of confusion, the distance between the imaging device and an imaged object can be determined. Distances obtained in this manner can then be used to construct three dimensional computer generated environments, sometimes referred to as virtual or 'CG' environments.

Figure 3:
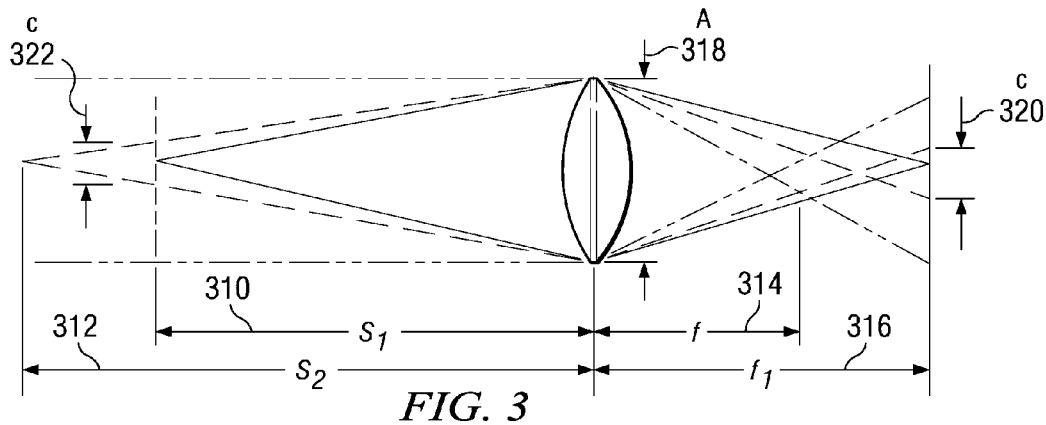
FIG. 3 is a schematic diagram illustrating the spatial relationships between the various physical parameters of an imaging system according to illustrative embodiments.

Referring now to FIG. 3, a schematic diagram is shown illustrating the spatial relationships between the various physical parameters of an imaging system according to illustrative embodiments. As can be seen from FIG. 3, the diameter of a resulting circle of confusion in the focal plane for an out-of-focus subject can be calculated by knowing the other physical parameters of an imaging system.

In FIG. 3, variables are defined as follows:
$S_1$ 310 is the distance at which an imaging device is focused;
$S_2$ 312 is the distance between the aperture of the imaging system and an imaged object;
f 314 is the focal length of the imaging device when focused at infinity;
$f_1$ 316 is the focal length at of the imaging device when focused $S_1$ 310;
A 318 is the aperture diameter of the imaging device;
c 320 is the diameter of the circle of confusion; and
C 322 is the blur.

The diameter of the circle of confusion can be calculated from the diameter of the blur circle in a virtual image in the object plane. This calculation is done using similar triangles, and then factoring the magnification of the imaging system. The magnification can be calculated from the lens equation. The blur of diameter C 322 in the focused object plane at distance $S_1$ 310 is an unfocused virtual image of the object at distance $S_2$ 312. The blur depends only on the $S_1$ 310 and $S_2$ 312 distances, and the aperture diameter A of the imaging device. The blur can be expressed as the formula:

$$C = A \cdot \frac{|S_2 - S_1|}{S_2}$$

The circle of confusion diameter c in the focal plane is obtained by scaling the blur C 322 by the magnification m of the imaging system:

$$c = C \cdot m$$

The magnification m is defined by the ratio of focus distances:

$$m = \frac{f_1}{S_1}$$

A rearrangement of the lens equation allows for determination of the focal distance $f_{11}$ 316 of a focused object plane at distance $S_1$ 310:

$$\frac{1}{f} = \frac{1}{f_1} + \frac{1}{S_1}$$

$$f_1 = \frac{f \cdot S_1}{S_1 - f}$$

Using a congruent triangle relationship, the diameter of the circle of confusion can be expressed in terms of distances $S_1$ 310, the magnification m, and the focal length of the imaging device when focused at infinity f 314:

$$m = \frac{f}{S_1 - f}$$

When the above equations are solved for the circle of confusion diameter c 320:

$$c = A \cdot \frac{|S_2 - S_1|}{S_2} \cdot \frac{f}{S_1 - f}$$

This formula is accurate for a simple paraxial thin-lens system in which A 318 is the diameter of both the entrance pupil and exit pupil of the imaging system. Using well-known lens equations and algebra, these equations can be extended to more complex lens designs if necessary.

Where the subject distances are measured from the entrance pupil and the magnification is known, the above equation simplifies to:

$$c = A \cdot m \cdot \frac{|S_2 - S_1|}{S_2}$$

For infinite focus distance, this equation simplifies even further:

$$c = \frac{f \cdot A}{S_2}$$

Solving for $S_2$ 312, the distance between the aperture of the imaging system and an imaged object:

$$S_2 = \frac{f \cdot A}{c}$$

Thus, by knowing the diameter of the circle of confusion c, the aperture diameter of the imaging device A, and the focal length of the imaging device at infinity f 314, one can calculate the distance from the imaging device to the imaged object.

Figure 4:
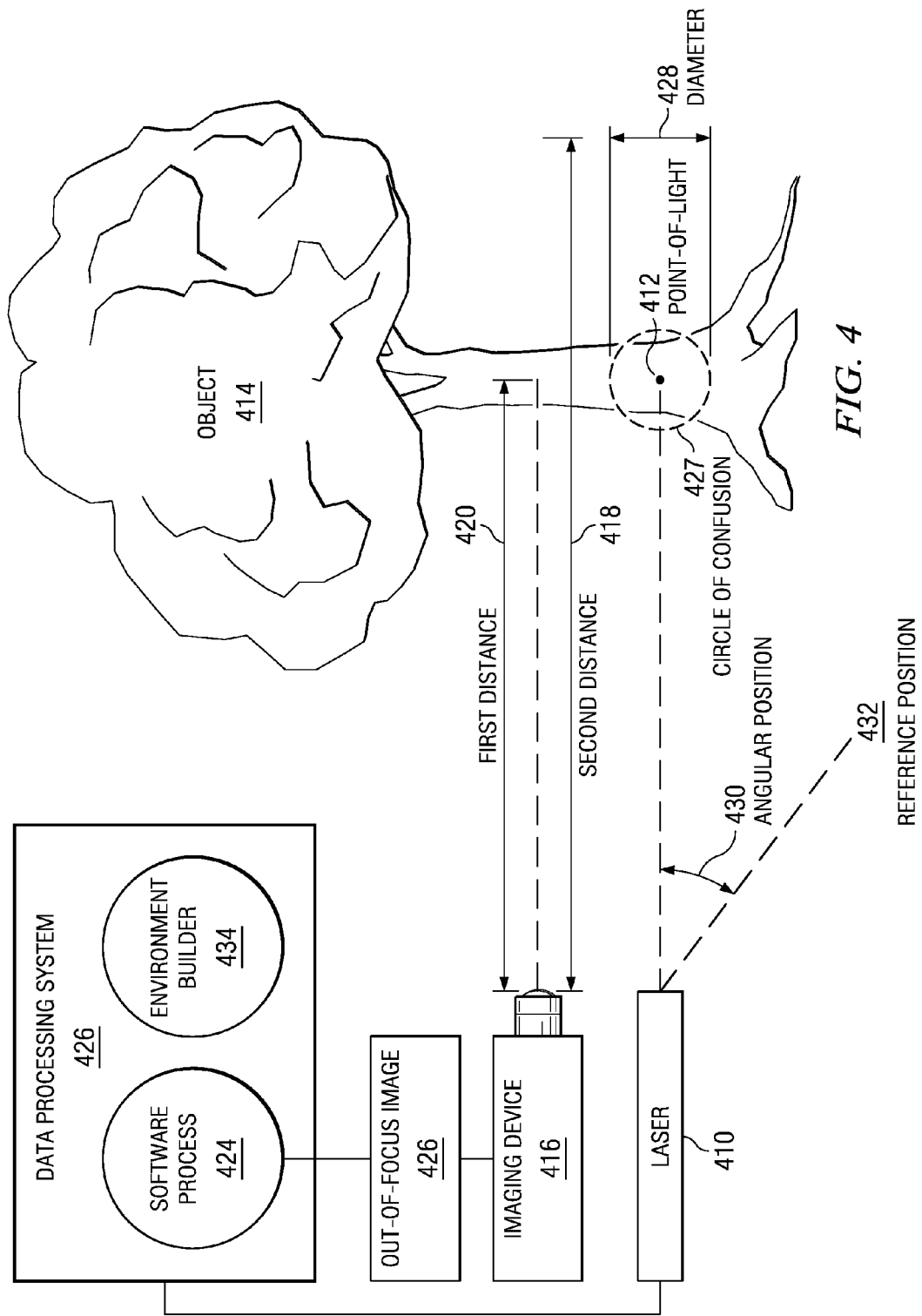
FIG. 4 is a diagram of the flow of data through the various hardware and software components according to illustrative embodiments.

Referring now to FIG. 4, a diagram of the flow of data through the various hardware and software components is depicted according to illustrative embodiments.

Light source 410 focuses point-of-light 412 on object 414. As used herein, "light source" is any high intensity light source, including a laser, capable of being seen from a distance by imaging device 416. Light source 410 can be a single high intensity light source, a plurality of light sources, or a single light source shown through a lattice structure so as to create a plurality of points-of-light. When a plurality of light sources, or a single light source shown through a lattice structure is utilized, a plurality of measurements can be obtained simultaneously, or near simultaneously.

Object 414 is located at a first distance 420 from imaging device 416. Object 414 can be any object having a surface onto which point-of-light 412 can be projected. Object 414 can be an indoor or outdoor environmental object, such as a tree or building. Imaging device 416 is focused at a second distance 418. Second distance 418 can be located between imaging device 416 and object 414. Second distance 418 can also be located at a distance further away from imaging device 416 than object 414. Second distance 418 can be infinite.

Imaging device 416 is any imaging device, including optical and digital imaging devices, capable of recording an image into a physical or digital medium. Imaging device 416 has an aperture through which imaging device views object 414. Imaging device 416 can be a digital camera, a video camera, a web camera, or other imaging device.

Imaging device 416 is connected to data processing system 422. Data processing system 422 can be data processing system 200 of FIG. 2. Data processing system 422 runs software process 424. Software process 424 executes within data processing system 422, and is capable of determining distances to various objects imaged by imaging device 416, based on the physical parameters of imaging device 416, and the diameter of a resulting circle of confusion corresponding to point-of-light 412 projected onto object 414. Physical parameters of imaging device 416 can include those parameters depicted in FIG. 1, as well as the resolution of imaging device 416.

Imaging device 416 records an out-of-focus image 426 of object 414. Out-of-focus image 426 includes an out-of-focus image of point-of-light 412 projected onto object 414. Based on the physical parameters of imaging device 416, the distance at which imaging device 416 is focused, the distance between the imaging device and object 414, point-of-light 412 will appear as circle of confusion 427 having diameter 428 in out-of-focus image 426.

Software process 424 receives out-of-focus image 426 from imaging device 416. Software process 424 measures diameter 428. Software process 424 can use any method to measure diameter 428, including, among other methods, physical comparisons, physical measurements, digital comparisons, digital measurements, ratios and, pixel counts. Once diameter 428 has been determined, software process 424 can use the known physical parameters of imaging device 416 to calculate first distance 420.

Software process 424 may also determine angular position 430. Angular position 430 is the angle that the aperture of imaging device 416 forms with arbitrary reference position 432. Angular position 430 can therefore provide an angular relationship between object 414 and arbitrary reference position 432.

Software process 424 can then send angular position 430 and first distance 420 to an environment builder 434. Environment builder 434 is a software process executing on a data processing system, such as data processing system 200 of FIG. 2. Environment builder 434 may be executed on data processing system 422, or on a separate data processing system. Environment builder 434 is capable of rendering a plurality of spatially related objects in order to produce a three dimensional virtual computer generated environment.

Responsive to receiving angular position 430 and first distance 420 from software process 424, environment builder 434 plots the position of object 414 within a coordinate system relative to imaging device 416. Environment builder 434 can then receive additional objects, including angular positions and distances therefore, from software process 424. Environment builder 434 plots each of these within the coordinate system, thus developing a spatial relationship between each object plotted on the coordinate system. The coordinate system may then be used to create a computer generated environment.

Figure 5:
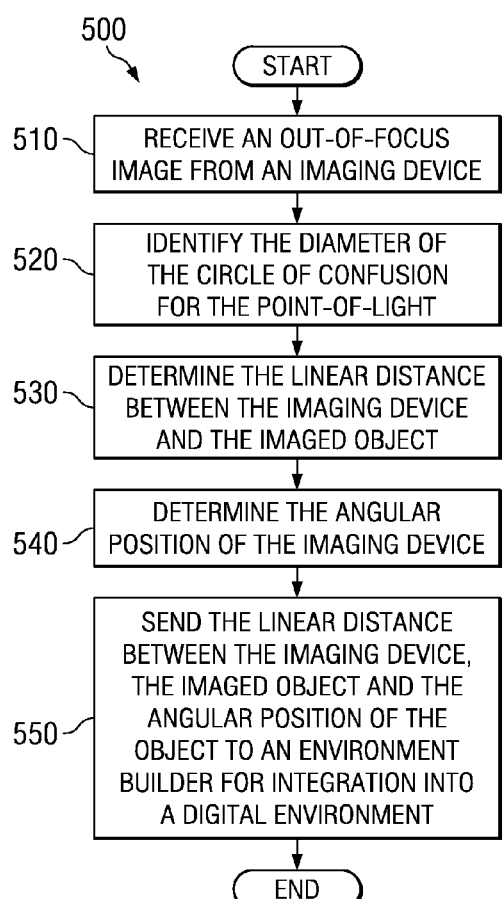
FIG. 5 is a flowchart depicting the processing steps for determining distances to remote objects according to illustrative embodiments.

Referring now to FIG. 5, a flowchart is shown depicting the processing steps for determining distances to remote objects according to illustrative embodiments. Process 500 is a software process, such as software process 424 of FIG. 4, executing on a data processing system, such as data processing system 422 of FIG. 4.

Process 500 begins by receiving an out-of-focus image from an imaging device (step 510). The out-of-focus image includes an out-of-focus point-of-light projected onto an object. The object is located at a first distance from the imaging device. The point-of-light is generated by a high intensity light source, such as light source 410 of FIG. 4. Based on the physical parameters of the imaging device, the distance at which the imaging device is focused, and the distance between the imaging device and the object onto which the point-of light is projected, the point-of-light will appear in the imaging device as a circle of confusion.

Responsive to receiving the out-of-focus image, process 500 identifies the diameter of the circle of confusion for the point-of-light (step 520). Process 500 can use any method to measure the diameter, including, among other methods, physical comparisons, digital comparisons, ratios and, pixel counts.

Once the diameter of the circle of confusion has been determined, process 500 determines the linear distance between the imaging device and the imaged object (step 530), using the known physical parameters of the imaging device. This can be determined from the relationship discussed in FIG. 3 above:

$$S_2 = \frac{f \cdot A}{c}$$

wherein:
$S_2$ is the distance to the imaged object;
f is the focal length of the imaging device when focused at infinity;
A is the aperture diameter of the imaging device; and
c is the diameter of the circle of confusion.

Process 500 may also determine the angular position of the imaging device (step 540). The angular position is the angle that the aperture of the imaging device forms with an arbitrary reference position. Therefore, the angular position defines the angular relationship between the imaged object and the arbitrary starting position.

Responsive to determining the linear distance between the imaging device and the imaged object, and the angular position of the object, process 500 sends the linear distance between the imaging device and the imaged object and the angular position of the object to an environment builder for integration into a digital environment (step 550). Process 500 terminates thereafter.

Figure 6:
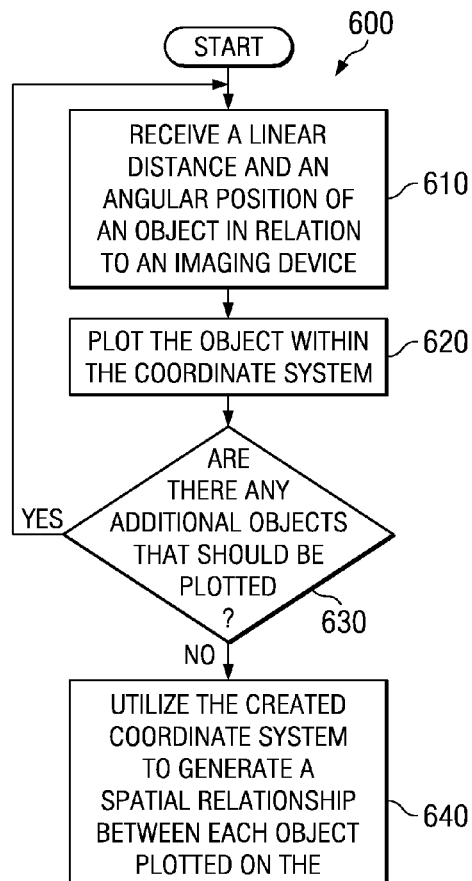
FIG. 6 is a flowchart depicting the processing steps for rendering spatially related objects in order to produce a three dimensional computer generated environment according to illustrative embodiments.

Referring now to FIG. 6, a flowchart is shown depicting the processing steps for rendering spatially related objects in order to produce a three dimensional computer generated environment according to illustrative embodiments. Process 600 is a software process, such as environment builder 434 of FIG. 4, executing on a data processing system, such as data processing system 422 of FIG. 4.

Process 600 begins by receiving a linear distance and an angular position of an object in relation to an imaging device (step 610). Linear distance and an angular position of the object are typically determined according to the process described above.

Responsive to receiving a linear distance and an angular position, process 600 plots the object within the coordinate system (step 620). The object is plotted utilizing the received linear distance and an angular position of the object. Process 600 thus develops a spatial relationship between the object plotted and a central reference point.

Process 600 determines if there are any additional objects that should be plotted (step 630). If there are additional objects that should be plotted ("yes" at step 630), process 600 returns to step 610. Linear distances and an angular positions for each additional object are received and plotted.

If there are no additional objects to be plotted ("no" at step 630), process 600 utilizes the created coordinate system to generate a spatial relationship between each object plotted on the coordinate system (step 640), with the process terminating thereafter. The coordinate system may then be used to create a computer generated environment.

Thus, the present embodiments provide a data processing system, computer implemented method, and computer program product code for generating an immersive three dimensional computer generated environment. A high intensity light is reflected from an object. An imaging system records a circle of confusion of the light on the object by focusing at some distance other than the focal plane of the object. The diameter of the circle of confusion is measured as well as the angular position of the object from the imaging device. The distance between the imaging device and the object is then determined. A data processing system can then generate an immersive three dimensional computer generated environment based on a central reference point of the imaging device, and the linear position and angular location of the imaged object. Other objects can also be incorporated into the virtual environment based on subsequent or concurrent measurements from the imaging device.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for determining distance to an object, the method comprising:

focusing a light source through a lattice pattern to create a plurality of points-of-light on a plurality of objects, each of the plurality of objects being located at a different one of a plurality of first distances from an initial reference location to create a plurality of points-of-light;

recording an out-of-focus image for each of the plurality of points-of-light on the plurality of objects to a plurality of out-of-focus images, each of the out-of-focus images having a circle of confusion within the out-of-focus image to form a plurality of circles of confusion;

identifying a diameter for each of the plurality of the circles of confusion from the plurality of out-of-focus images of the plurality of points-of-light to form a plurality of identified diameters; and identifying the plurality of first distances, wherein the plurality of first distances is calculated from the identified diameters of the plurality of circles of confusion.

2. The method of claim 1, wherein the step of recording the out-of-focus image for each of the plurality of points-of-light on the plurality of objects-to a plurality of out-of-focus images further comprises focusing an imaging device on a focal plane at a second distance, wherein the second distance is different from the plurality of first distances.

3. The method of claim 2, wherein the second distance is infinite.

4. The method of claim 2, wherein the imaging device is digital camera, a video camera, or a web camera.

5. The method of claim 1, wherein the step of identifying a diameter for each of the plurality of the circles of confusion from the plurality of out-of-focus images of the plurality of points-of-light to form a plurality of identified diameters further comprises:

identifying a diameter for each of the plurality of the circles of confusion from the plurality of out-of-focus images of the plurality of points-of-light to form a plurality of identified diameters using at least one of physical comparisons, physical measurements, digital comparisons, digital measurements, ratios and pixel counts.

6. The method of claim 1 further comprising:

determining an angular position of each of the plurality of objects to form a plurality of angular positions, and plotting the plurality of objects within a coordinate system utilizing the plurality of first distances and the plurality of angular positions.

7. The method of claim 6, further comprising the step of implementing the plurality of objects within a computer generated environment, the computer generated environment being created in part from the coordinate system.

8. A computer program product comprising:

a computer usable medium in a computer readable medium having computer usable program code for configuring components in a data processing system, the computer program product comprising:

computer usable program code for focusing a light source through a lattice pattern to create a plurality of points-of-light on a plurality of objects, each of the plurality of objects being located at a different one of a plurality of first distances from an initial reference location to create a plurality of points-of-light;

computer usable program code for, responsive to focusing the light source on the object, recording an out-of-focus image for each of the plurality of points-of-light on the plurality of objects to a plurality of out-of-focus images, each of the out-of-focus images having a circle of confusion within the out-of-focus image to form a plurality of circles of confusion;

computer usable program code for, responsive to recording the out-of-focus image, identifying a diameter for each of the plurality of the circles of confusion from the plurality of out-of-focus images of the plurality of points-of-light to form a plurality of identified diameters; and computer usable program code for, responsive to identifying the diameter of the circle of confusion, identifying the plurality of first distances, wherein the plurality of first distances is calculated from the identified diameters of the plurality of circles of confusion.

9. The computer program product of claim 8 wherein the computer usable program code for recording the out-of-focus image further comprises computer usable program code for focusing an imaging device on a focal plane at a second distance, wherein the second distance is different from the plurality of first distances.

10. The computer program product of claim 9 wherein the second distance is infinite.

11. The computer program product of claim 9, wherein the imaging device is a digital camera, a video camera, or a web camera.

12. The computer program product of claim 8, wherein the computer usable program code for identifying a diameter for each of the plurality of the circles of confusion from the plurality of out-of-focus images of the plurality of points-of-light to form a plurality of identified diameters further comprises computer usable program code for identifying a diameter for each of the plurality of the circles of confusion from the plurality of out-of-focus images of the plurality of points-of-light to form a plurality of identified diameters using at least one of physical comparisons, physical measurements, digital comparisons, digital measurements, ratios and pixel counts.

13. The computer program product of claim 8 further comprising computer usable program code for determining an angular position of each of the plurality of objects to form a plurality of angular positions, and computer usable program code for plotting the plurality of objects within a coordinate system utilizing the plurality of first distances and the plurality of angular positions.

14. The computer program product of claim 13, further comprising computer usable program code for, responsive to determining the first distance and determining the angular position of each of the plurality of objects, implementing the plurality of objects within a computer generated environment, the computer generated environment being created in part from the coordinate system.

15. A data processing system comprising:

a bus;

a communications unit connected to the bus;

a storage device connected to the bus, wherein the storage device includes computer usable program code; and a processor unit connected to the bus, wherein the processor unit executes the computer usable program code to focus a light source through a lattice pattern to create a plurality of points-of-light on a plurality of objects, each of the plurality of objects being located at a different one of a plurality of first distances from an initial reference location to create a plurality of points-of-light, responsive to focusing the light source on the object, to record an out-of-focus image for each of the plurality of points-of-light on the plurality of objects to a plurality of out-of-focus images, each of the out-of-focus images having a circle of confusion within the out-of-focus image to form a plurality of circles of confusion, responsive to recording the out-of-focus image, to identify a diameter for each of the plurality of the circles of confusion from the plurality of out-of-focus images of the plurality of points-of-light to form a plurality of identified diameters, and responsive to identifying the diameter of the circle of confusion, to identify the plurality of first distances, wherein the plurality of first distances is calculated from the identified diameters of the plurality of circles of confusion.

16. The data processing system of claim 15, wherein the processor further executes code to identify an angular position of each of the plurality of objects to form a plurality of angular positions; to plot the plurality of objects within a coordinate system utilizing the plurality of first distances and the plurality of angular positions; and responsive to determining the first distance and determining the angular position, to implement the plurality of objects within a computer generated environment, the computer generated environment being created in part from the coordinate system.

* * * * *